(12) United States Patent
Moon

(10) Patent No.: US 12,152,888 B2
(45) Date of Patent: Nov. 26, 2024

(54) MANAGEMENT METHOD OF SHARED VEHICLE AND SERVER PERFORMING THE SAME

(71) Applicants: Hyundai Motor Company, Seoul (KR); Kia Corporation, Seoul (KR)

(72) Inventor: Sunghwan Moon, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 92 days.

(21) Appl. No.: 17/569,745

(22) Filed: Jan. 6, 2022

(65) Prior Publication Data
US 2022/0412753 A1 Dec. 29, 2022

(30) Foreign Application Priority Data
Jun. 28, 2021 (KR) .................. 10-2021-0083925

(51) Int. Cl.
*G01C 21/34* (2006.01)
*G06Q 10/02* (2012.01)

(52) U.S. Cl.
CPC ..... *G01C 21/3438* (2013.01); *G01C 21/3461* (2013.01); *G06Q 10/02* (2013.01)

(58) Field of Classification Search
CPC . G01C 21/3438; G01C 21/3461; G06Q 10/02
See application file for complete search history.

(56) References Cited

U.S. PATENT DOCUMENTS

| 2017/0316535 A1* | 11/2017 | Hirose | G06Q 50/40 |
| 2019/0228466 A1* | 7/2019 | Kojima | G06Q 30/0645 |
| 2019/0272568 A1* | 9/2019 | Umeda | G01C 21/3407 |
| 2019/0318275 A1* | 10/2019 | Sakurada | G06Q 10/02 |
| 2020/0013112 A1* | 1/2020 | Cho | G06Q 10/06313 |
| 2020/0104964 A1* | 4/2020 | Yasui | G06Q 50/40 |
| 2020/0294119 A1* | 9/2020 | Sugimura | G08G 1/0175 |
| 2020/0326714 A1* | 10/2020 | Iwamoto | G08G 1/202 |
| 2022/0113146 A1* | 4/2022 | Colon | G01C 21/3423 |
| 2022/0261705 A1* | 8/2022 | Takiguchi | B60L 53/10 |
| 2022/0301430 A1* | 9/2022 | Sudo | H04N 7/183 |
| 2022/0318719 A1* | 10/2022 | Dhingra | G07C 9/00571 |
| 2022/0333937 A1* | 10/2022 | Jung | G01C 21/3415 |

FOREIGN PATENT DOCUMENTS

| JP | 2009061978 A | 3/2009 |
| JP | 6237930 B2 | 11/2017 |
| KR | 10-2012-0134359 A | 2/2012 |
| KR | 10-2159769 B1 | 9/2020 |

* cited by examiner

*Primary Examiner* — Peter D Nolan
*Assistant Examiner* — Mikko Okechukwu Obioha
(74) *Attorney, Agent, or Firm* — Morgan, Lewis & Bockius LLP

(57) ABSTRACT

A server as a server for providing a vehicle sharing service includes: a storage device configured for storing first information for designating one of a scheduled booking method and an immediate booking method as a booking method for each of a plurality of shared vehicles; and a control device configured to permit the booking as the scheduled booking method for a shared vehicle to which the scheduled booking method is specified among the plurality of shared vehicles, and the booking as the immediate booking method for a shared vehicle to which the immediate booking method is specified among the plurality of shared vehicles.

12 Claims, 6 Drawing Sheets

MANAGEMENT METHOD OF SHARED VEHICLE AND SERVER PERFORMING THE SAME

CROSS-REFERENCE TO RELATED APPLICATION

The present application claims priority to Korean Patent Application No. 10-2021-0083925 filed on Jun. 28, 2021, the entire contents of which is incorporated herein for all purposes by this reference.

BACKGROUND OF THE INVENTION

Field of the Invention

The present invention relates to a management method of a shared vehicle and a server for performing the same. More particularly, the present invention relates to a management method of a shared vehicle for providing a vehicle sharing service and a server for performing the same.

Description of Related Art

Car sharing is a method in which multiple users share and use one vehicle, and the users who use the car sharing may rent a vehicle for a unit of time and use the car for a predetermined amount of time. In this car sharing service, the method of managing the rental/return position of the vehicle or the method of managing the vehicle are different depending on the service provider.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a management method of a shared vehicle for providing a vehicle sharing service that supports both a scheduled booking method and an immediate booking method, and a server that performs the same.

A server as a server for providing a vehicle sharing service according to various exemplary embodiments of the present invention includes: a storage device configured for storing first information for designating one of a scheduled booking method and an immediate booking method as a booking method for each of a plurality of shared vehicles; and a control device permitting the booking as the scheduled booking method for a shared vehicle to which the scheduled booking method is specified among the plurality of shared vehicles, and the booking as the immediate booking method for a shared vehicle to which the immediate booking method is specified among the plurality of shared vehicles.

The server may further include a communication device communicating with a user terminal, and the control device may receive selection information for a shared vehicle booking from the user terminal, and determines any one of the scheduled booking method and the immediate booking method as the vehicle booking method based on the received selection information, and performs a booking procedure according to the determined vehicle booking method.

The control device may determine the shared vehicle assigned to a user of the user terminal among the shared vehicles to which a same booking method as the determined vehicle booking method is specified.

The control device may determine at least one shared vehicle to be bookable corresponding to the selection information among the shared vehicles to which the same booking method as the determined vehicle booking method is specified, and allocate the shared vehicle selected by the user terminal among at least one shared vehicle to be bookable to the user.

The storage device may store second information for designating one of a station based method and a free floating method as a position management method for each of a plurality of service zones in which the vehicle sharing service is provided The control device may manage a rental position and a return position of the shared vehicle in each service zone according to the second information.

The control device may manage the rental position and the return position so that the rental and return are possible only at a station for the service zone where the station-based method is specified among the plurality of service zones, and manage the rental position and the return position so that the rental and return are possible at a place for the service zone to which the free floating method is specified among the plurality of service zones.

The scheduled booking method may be a method in which a user sets a rental period in advance and selects the shared vehicle to be booked among the shared vehicles that may be rented in a predetermined rental period, and the immediate booking method may be a method in which the user selects the shared vehicle to be booked among the shared vehicles currently available for use by the user.

A management method of a shared vehicle of a server for providing a vehicle sharing service according to various exemplary embodiments of the present invention includes: designating one of a scheduled booking method and an immediate booking method as a booking method for each of the plurality of shared vehicles; and managing a booking for each of the plurality of shared vehicles according to the designated booking method, and in the managing of the booking, the booking is permitted with the scheduled booking method for the shared vehicle to which the scheduled booking method is specified among the plurality of shared vehicles, and the booking is permitted with the immediate booking method for the shared vehicle to which the immediate booking method is specified among the plurality of shared vehicles.

The managing of the booking may include receiving selection information for the shared vehicle booking from a user terminal, determining one of the scheduled booking method and the immediate booking method as a vehicle booking method according to the received selection information, and determining the shared vehicle assigned to a user of the user terminal among the shared vehicles to which a same booking method as the determined vehicle booking method is designated.

The determining of the shared vehicle assigned to the user may include determining at least one shared vehicle to be bookable in response to the selection information among the shared vehicles to which the same booking method as the determined vehicle booking method is specified, and allocating the shared vehicle selected by the user terminal among at least one shared vehicle available for the booking to the user.

The management method of the shared vehicle may further include obtaining additional information for each shared vehicle according to the specified booking method, and the additional information may include a minimum usage time or a buffer time before/after the rental period for the shared vehicle for which the scheduled booking method is specified, and a rebooking limit or waiting time after the booking for the shared vehicle for which the immediate booking method is specified.

According to exemplary embodiments of the present invention, it is possible to provide the vehicle sharing service that supports both the scheduled booking method and the immediate booking method.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
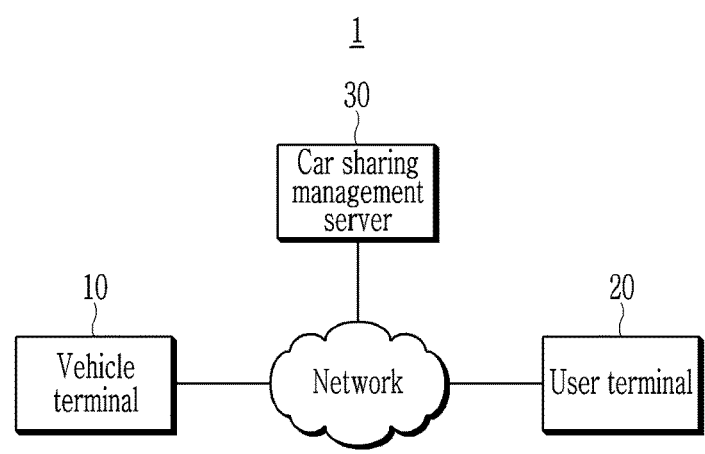
FIG. 1 is a schematic view showing a vehicle sharing system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments included in the exemplary embodiment will be described in detail with reference to the accompanying drawings. In the exemplary embodiment, the same or similar constituent elements will be denoted by the same or similar reference numerals, and an overlapped description thereof will be omitted.

The terms "module" and "unit" for components used in the following description are used only to easily write the specification. Therefore, these terms do not have meanings or roles that distinguish them from each other in and of themselves. Furthermore, in describing exemplary embodiments of the exemplary embodiment, when it is determined that a detailed description of the well-known art associated with the present invention may obscure the gist of the present invention, it will be omitted. Furthermore, the accompanying drawings are provided only to allow exemplary embodiments included in the exemplary embodiment to be easily understood and are not to be interpreted as limiting the spirit included in the exemplary embodiment, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or directly coupled to another component or may be connected or coupled to another component with the other component intervening therebetween. On the other hand, it is to be understood that when one component is referred to as being "connected or coupled directly" to another component, it may be connected to or coupled to another component without another component intervening therebetween.

It will be further understood that term "comprise" or "have" used in the exemplary embodiment specifies the presence of stated features, numerals, steps, operations, components, parts, or a combination thereof, but does not preclude the presence or addition of one or more other features, numerals, steps, operations, components, parts, or a combination thereof.

Furthermore, the terms "-er", "-or", and "module" described in the specification mean units for processing at least one function and operation, and may be implemented by hardware components or software components and combinations thereof.

FIG. 1 is a schematic view showing a vehicle sharing system for providing vehicle sharing according to an exemplary embodiment of the present invention.

Referring to FIG. 1, a vehicle sharing system 1 may include a vehicle terminal 10, a user terminal 20, and a vehicle sharing management server 30.

The vehicle terminal 10 may be mounted on a vehicle (hereinafter, referred to as "a shared vehicle") used for a vehicle sharing service. The vehicle terminal 10 may be connected to the vehicle sharing management server 30 through a communication network.

The vehicle terminal 10 may cooperate with the vehicle sharing management server 30 to register the vehicle on which it is mounted as a shared vehicle to the vehicle sharing management server 30. The vehicle terminal 10 may transmit vehicle registration information for registering the vehicle on which it is mounted as a shared vehicle to the vehicle sharing management server 30. The vehicle registration information may include a vehicle number of the corresponding vehicle and vehicle body information (a vehicle type, a vehicle year, a color, options, etc.).

The vehicle registration information may further include information designating a booking method of the vehicle. In the shared vehicle, a booking method may be designated as one of a scheduled booking (ScB) method or an immediate booking (IB) method. The ScB method is a method in which a user sets a rental period in advance and selects a shared vehicle to be booked among the shared vehicles which may be rented for a predetermined rental period. The IB method is a method in which the user selects the shared vehicle to be booked among the currently available shared vehicles. When the vehicle registration information includes the information designating the booking method of the vehicle, the vehicle registration information may further include additional information related to the designated booking method. For example, when the designated booking method is the ScB method, the vehicle registration information may further include the additional information for a minimum usage time, a buffer time before/after the rental period, and the like. The buffer time may indicate the time from the end of the rental period of the previous user until the booking of the next user is permitted. The buffer time is a parameter to ensure that the next user can use the shared vehicle at a predetermined time even if the return time of the previous user is delayed. Furthermore, for example, when the designated booking method is the IB method, the vehicle registration information may further include additional information related to a rebooking limit, a waiting time after the booking, and the like. The rebooking limit is a parameter for limiting the number of times for the user using the shared vehicle to increase the usage time by rebooking the corresponding shared vehicle. The vehicle sharing management server 30 may limit the number of times that the user using the shared vehicle with the IB method rebooks the shared vehicle based on the present parameter. The waiting time after the booking is a parameter that defines the waiting time until receiving the shared vehicle after the user requests the booking of the shared vehicle. When searching for the available shared vehicles, the vehicle sharing management server 30 may narrow the search range to the shared vehicles which may be received within the waiting time defined by the present parameter.

The vehicle registration information may further include vehicle base information. The vehicle terminal 10 may transmit the base information indicating the station or the zone which is the base of the shared vehicle on which it is mounted among the stations or zones managed by the vehicle sharing management server 30 to the vehicle sharing management server 30.

The vehicle terminal 10 may collaborate with the vehicle sharing management server 30 to manage the booking status of the shared vehicle on which it is mounted. The vehicle terminal 10 may receive the booking status information of the shared vehicle on which it is mounted from the vehicle sharing management server 30. The booking status information received from the vehicle sharing management server 30 may include user information and booking information of each user who booked the shared vehicle. The booking information may include the information such as a booking number, a rental period/rental time of the vehicle, a rental position, and a return position. When the booking status information is received from the vehicle sharing management server 30, the vehicle terminal 10 may provide the return position of the corresponding shared vehicle, a remaining usage time, and path guidance information (a movement path, an expected arrival time, etc.) until the return position is reached to the user on board the vehicle based on the booking status information.

The vehicle terminal 10 may transmit the usage status information of the shared vehicle on which it is mounted to the vehicle sharing management server 30. The usage status information may include an actual vehicle usage time of each user using the corresponding shared vehicle, a moving distance, current position information of the shared vehicle, and the like. The vehicle terminal 10 may transmit the vehicle status information of the shared vehicle to the vehicle sharing management server 30. The vehicle status information may include information related to a fuel status, a vehicle speed, a travel distance, a failure status, and the like of the corresponding shared vehicle.

The user terminal 20 is a terminal of the user who wants to use the vehicle sharing service, and may be connected to the vehicle sharing management server 30 through a communication network. The user terminal 20 may access the vehicle sharing management server 30 through a web browser or an application (APP). The information transfer between the user terminal 20 and the vehicle sharing management server 30 may be made through a web browser or application executed on the user terminal 20.

The user terminal 20 may cooperate with the vehicle sharing management server 30 to register the corresponding user as a member in the vehicle sharing management server 30. To the present end, the user terminal 20 may transmit the user registration information to the vehicle sharing management server 30. The user registration information may include user identification information (ID), user authentication information (a password, fingerprint information, etc.), user personal information (a name, a phone number, an address, etc.), payment information (credit card information, an account number, etc.).

The user terminal 20 may set up a vehicle sharing usage booking for the shared vehicle registered in the vehicle sharing management server 30 in cooperation with the vehicle sharing management server 30. The user terminal 20 may transmit the selection information necessary for booking the shared vehicle to the vehicle sharing management server 30. The user terminal 20 may transmit the selection information related to the vehicle rental period/rental time, the rental position (or the current position), the return position, the vehicle type, etc. to the vehicle sharing management server 30. The user terminal 20 may also transmit the selection information for the vehicle booking method (the ScB and IB methods) to the vehicle sharing management server 30. The user terminal 20 may receive a list of the bookable shared vehicles from the vehicle sharing management server 30 as a response to the selection information. The user terminal 20 may provide the shared vehicle list received from the vehicle sharing management server 30 to the user by displaying it on a display. The user terminal 20 may select any one of the shared vehicles included in the shared vehicle list based on the user's selection input. The user terminal 20 may transmit the information (e.g., the vehicle identification information) about the selected shared vehicle to the vehicle sharing management server 30 to book the usage of the selected shared vehicle. When the booking for the shared vehicle selected by the vehicle sharing management server 30 is confirmed, the user terminal 20 may receive the corresponding booking history information from the vehicle sharing management server 30.

The vehicle sharing management server 30 may communicate with the vehicle terminal 10 and the user terminal 20 through the communication network.

The vehicle sharing management server 30 may register and manage the corresponding vehicle as the shared vehicle based on vehicle registration information received from the vehicle terminal 10.

The vehicle sharing management server 30 may designate a vehicle booking method (ScB, IB) for each shared vehicle registered in the vehicle sharing management server 30. The vehicle sharing management server 30 may specify the vehicle booking method for each shared vehicle based on the information received from the vehicle terminal 10 or a manager terminal, or the selection input received from the manager through an input device. When the vehicle booking method of the shared vehicle is designated as the ScB method, the vehicle sharing management server 30 may allow only the booking of the ScB method for the shared vehicle. On the other hand, when the vehicle booking method of the shared vehicle is designated as the IB method, the vehicle sharing management server 30 may allow only the IB method booking for the shared vehicle. When both the ScB method and the IB method are allowed for one shared vehicle, the booking of the ScB method and the booking of the IB method for one shared vehicle may be overlapped, which may cause various problems. For example, the shared vehicle booked with the ScB method may be booked with the IB method by another user while waiting in time with the booked rental timing. In the instant case, the user who booked the shared vehicle by the ScB method may not receive the shared vehicle in time. Also, for example, the shared vehicle which is being rented after being booked by the IB method may be booked by another user by the ScB method. In the instant case, if the user who is renting by booking the shared vehicle by use of the IB method wants to extend the rental time, a situation may occur in which the extension is impossible due to the next user booking the corresponding shared vehicle by the ScB method. Therefore, in the present exemplary embodiment of the present invention, the booking method is specified in advance for each shared vehicle registered in the vehicle sharing management server 30, and each shared vehicle is booked only by the predetermined booking method, so that the overlapping of the booking of the ScB method and the booking of the IB method for one shared vehicle is prevented.

The vehicle sharing management server 30 may transmit the booking status information of the shared vehicle to the corresponding vehicle terminal 10 when the vehicle sharing usage booking for the shared vehicle is registered.

The vehicle sharing management server 30 may receive the usage status information and the vehicle status information of the corresponding shared vehicle from the vehicle terminal 10. The vehicle sharing management server 30 may determine the usage fee of the corresponding shared vehicle based on the usage status information received from the vehicle terminal 10 or manage the sharing schedule of the corresponding shared vehicle.

The vehicle sharing management server 30 may register and manage the corresponding user as a member of the vehicle sharing management server 30 based on the user registration information received from the user terminal 20.

The vehicle sharing management server 30 may receive the selection information required to book the shared vehicle from the user terminal 20. The vehicle sharing management server 30 may search the shared vehicles matched to the selection information received from the user terminal 20 among the registered shared vehicles. When the shared vehicle matching the received selection information is searched, the vehicle sharing management server 30 may transmit the list of the searched shared vehicles, that is, the list of the bookable shared vehicles, to the user terminal 20. Thereafter, when any one shared vehicle is selected from the shared vehicle list by the user terminal 20, the vehicle sharing management server 30 may allocate the selected shared vehicle to the user of the user terminal 20. That is, the vehicle sharing management server 30 may decide to rent the shared vehicle selected by the user terminal 20 to the user of the user terminal 20, and may register the vehicle sharing usage booking for the shared vehicle based on the selection information received from the user terminal 20. The vehicle sharing management server 30 may generate the booking information including a rental position (or a receiving position) of the shared vehicle, a return position, a rental period/rental time, etc., based on the selection information received from the user terminal 20. The vehicle sharing management server 30 may store the generated booking information by mapping it to the corresponding shared vehicle. Furthermore, the vehicle sharing management server 30 may transmit the booking history information to the user terminal 20 based on the generated booking information.

The vehicle sharing management server 30 may manage a service area that provides the vehicle sharing service. The vehicle sharing management server 30 may divide the service area provided by the vehicle sharing service into a plurality of service zones. The vehicle sharing management server 30 may manage the service zone information for each service zone. The service zone information may include zone identification information (ID) allocated to the corresponding service zone, zone information of the corresponding service zone, and the like. The service zone information may further include information for designating a method (hereinafter, referred to as an 'a position management method') for managing the rental/return position of the vehicle in the corresponding service zone. As the position management method, a station based (SB) method or a free floating (FF) method may be used. The SB method is a method in which the rental/return of the shared vehicle is allowed only at a designated station. In the service zone where the SB method is designated (hereinafter, referred to as 'an SB service zone'), the shared vehicles may be grouped and managed on a station basis. The service zone information of the SB service zone may further include a list of the stations positioned in the corresponding zone, identification information (ID, a place name, etc.) and position information of each station, a list of the shared vehicles stocked in each station, and the like. The FF method is a method allowing the rental/return of the shared vehicle at any place other than the designated station. In the service zone where the FF method is designated (hereinafter, referred to as 'an FF service zone'), the position of the vehicle may be managed for each shared vehicle. The service zone information of the FF service zone may further include identification information and position information of each shared vehicle positioned in the corresponding zone.

The above-described service zones may be configured so that the corresponding regions are distinguished from each other. That is, service zones may be set so that the areas do not overlap each other. The service zones may be set so that a part of the corresponding areas overlap each other. For example, at least a partial area of the FF service zone may overlap the SB service zone.

The vehicle sharing management server 30 may register base information for each shared vehicle registered in the vehicle sharing management server 30. The vehicle sharing management server 30 may register any one of the stations registered in the vehicle sharing management server 30 as a base for the shared vehicle. In the instant case, the base information of the shared vehicle may include identification information (ID, a place name, etc.) and position information of the corresponding station. The vehicle sharing management server 30 may register any one of the service zones registered in the vehicle sharing management server 30 as a base of the shared vehicle. In the instant case, the base information of the shared vehicle may include identification information (ID, a place name, etc.) of the corresponding service zone and area information.

The vehicle sharing management server 30 may designate a position management method (the SB method or the FF method) for each shared vehicle registered in the vehicle sharing management server 30 for convenience of management. In the instant case, each shared vehicle may have a rental/return position determined according to the designated position management method. For example, for the shared vehicle to which the SB method is designated as the position management method, the rental and return may be permitted only by the designated stations. Furthermore, for example, for the shared vehicle to which the FF method is designated as the position management method, the rental and return may be permitted at any place within the specified service zone.

The vehicle sharing management server 30 may designate the position management method for each shared vehicle based on the selection information received from the vehicle terminal 10 or the manager terminal, or the selection input received from the manager through an input device.

The vehicle sharing management server 30 may automatically set the position management method of the shared vehicle according to the booking method designated for the shared vehicle. For example, in the case of the shared vehicle which may be booked by the ScB method, the position management method may be designated as the SB method. Furthermore, for example, in the case of the shared vehicle which may be booked by the IB method, the position management method may be designated as the FF method.

Figure 2:
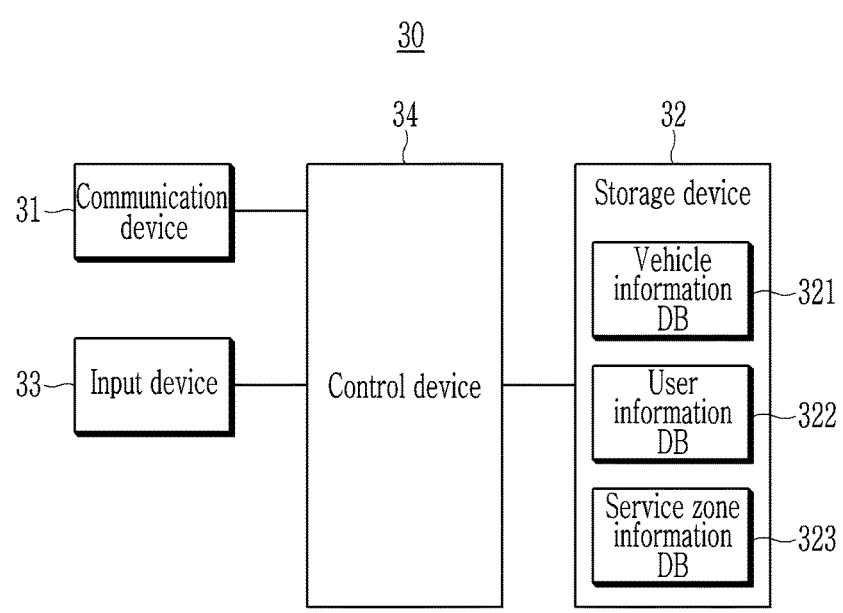
FIG. 2 is a schematic view showing a vehicle sharing management server according to an exemplary embodiment of the present invention.

FIG. 2 is a schematic view showing the vehicle sharing management server 30 of FIG. 1.

Referring to FIG. 2, the vehicle sharing management server 30 may include a communication device 31, a storage device 32, an input device 33, and a control device 34.

The communication device 31 is connected to an external device (a vehicle terminal 10, a user terminal 20, a manager terminal, etc.) through a communication network, and may perform a communication function between the vehicle sharing management server 30 and the external device. For example, the communication device 31 may receive the vehicle registration information, the usage status information, the vehicle status information, and the like from the vehicle terminal 10, and transmit the booking status information, etc. to the vehicle terminal 10. Furthermore, for example, the communication device 31 may receive the user registration information, the selection information, etc. from the user terminal 20 and transmit the booking history information, etc. to the user terminal 20.

The storage device 32 may store various types of information and data required to provide a vehicle sharing service in the vehicle sharing management server 30. The storage device 32 may include a vehicle information database (DB) 321, a user information DB 322, and a service zone information DB 323.

The vehicle information DB 321 may store the vehicle information related to the vehicles registered as the shared vehicle in the vehicle sharing management server 30. Here, the vehicle information may include the vehicle number of each shared vehicle, the vehicle body information (the vehicle type, the vehicle year, a color, options, etc.), the base information, the booking status information (the booking list, the booking number of each booking included in the booking list, the user information, the vehicle rental period/rental time, the vehicle rental position, the vehicle return position, etc.), the usage history information (the actual rental period/rental time of each booking included in the booking list, the travel distance, the current position information, etc.), the vehicle status information (the fuel status, the vehicle speed, the travel distance, the failure status, etc.), and the like. Furthermore, the vehicle information may further include information (or a predetermined value) indicating the predetermined booking method (the ScB method or the IB method) for each shared vehicle. Furthermore, the vehicle information may further include information (or a predetermined value) indicating the predetermined position management method (the SB method or the FF method) for each shared vehicle.

The user information DB 322 may store user information related to the users registered as the members in the vehicle sharing management server 30. Here, the user information may include the user identification information (ID) of each user, the user authentication information (the password, the fingerprint information, etc.), the personal information (the name, the phone number, the address, etc.), the payment information (the credit card information, the account number, etc.), and the booking history information.

The service zone information DB 323 may include the service zone information for the service zones managed by the vehicle sharing management server 30. Here, the service zone information may include the zone identification information (ID, the place name, etc.) of each service zone, the zone information, the position management method (the SB method or FF method), and the like. In the case of the SB service zone, the service zone information may further include the list of the stations positioned within the service zone, the identification information (ID, the place name, etc.) and the position information of each station, and the shared vehicle list being managed by each station. In the case of the FF service zone, the service zone information may further include the identification information and the position information of each shared vehicle positioned in the corresponding service zone.

The input device 33 may receive the various information and the control inputs from an administrator who manages the vehicle sharing management server 30.

The control device 34 may perform the overall control operations for the vehicle sharing management server 30 to manage the vehicle sharing service.

The control device 34 may register the service zones to the vehicle sharing management server 30. The control device 34 may receive the information for registering the service zone from the manager through the input device 33, or may receive the information for registering the service zone from the manager terminal through the communication device 31. During the service zone registration, the control device 34 may acquire the service zone information including the identification information (ID, the place name, etc.) of each service zone, the position information, the area information, and the like. The control device 34 may store and manage the service zone information of each service zone in the service zone information DB 323.

The control device 34 may designate the position management method (the SB method or the FF method) of each service zone during the service zone registration. When the position management method of each service zone is designated, the control device 34 may map the information (or a predetermined value) indicating the position management method of each service zone to the corresponding service zone and store it in the service zone information DB 323. Furthermore, the control device 34 may acquire additional information related to the position management method of each service zone based on the information received from the manager or the manager terminal. For example, the control device 34 may acquire, as additional information, the list of the stations positioned in the corresponding zone, the identification information (ID, the place name, etc.), and the position information of each station for the SB service zone. Furthermore, for example, the control device 34 may obtain, as additional information, area display information for displaying the corresponding service zone in a polygonal form for the FF service zone. When the additional information related to the position designation method specified for each service zone is acquired, the control device 34 may store the acquired additional information in the service zone information DB 323.

The control device 34 may register the vehicles used for the vehicle sharing service as the shared vehicle in the vehicle sharing management server 30. To the present end, the control device 34 may receive the vehicle registration information from the vehicle terminal 10 or the manager terminal through the communication device 31, or may receive the vehicle registration information from the manager through the input device 33. The control device 34 may store the vehicle information of the corresponding vehicle in the vehicle information DB 321 based on the vehicle registration information obtained in a process of registering the shared vehicle.

The control device 34 may designate the vehicle booking method (ScB and IB) for each shared vehicle registered in the vehicle sharing management server 30. The control device 34 may receive the information designating the booking method of each shared vehicle from the vehicle terminal 10 or the manager terminal through the communication device 31, and may designate the booking method of each shared vehicle based on this. The control device 34 may designate the booking method of each shared vehicle based on the control input received from the manager through the input device 33. When the booking method of each shared vehicle is specified, the control device 34 may map the information (or a predetermined value) indicating the booking method specified for each shared vehicle to the corresponding shared vehicle and store it in the vehicle information DB 321. When the booking method of each shared vehicle is designated, the control device 34 may further receive the additional information related to the designated booking method through the vehicle terminal 10, the manager terminal, or the input device 33. For example, when the booking method specified for the shared vehicle is the ScB method, the control device 34 may further receive the additional information related to the minimum usage time of the shared vehicle, the buffer time before/after the rental period, and the like. Also, for example, when the booking method specified for the shared vehicle is the IB method, the control device 34 may further receive the additional information related to the rebooking limit of the shared vehicle, the waiting time after the booking, and the like. When the additional information related to the booking method specified for each shared vehicle is obtained, the control device 34 may map it to the corresponding shared vehicle and store it in the vehicle information DB 321.

The control device 34 may automatically designate the position management method for the shared vehicle according to the booking method of each shared vehicle. For example, the control device 34 may designate the SB method as the position management method for the shared vehicle to which the ScB method is specified. In the instant case, the shared vehicle booked by the ScB method may be managed so that the rental and return are performed only at the designated stations. Furthermore, for example, the control device 34 may designate the FF method as the position management method for the shared vehicle to which the IB method is specified. In the instant case, the shared vehicle booked by the IB method may be managed so that the rental and return are possible at any place in the service zone operated by the FF method.

The control device 34 may register the base information for each shared vehicle registered in the vehicle sharing management server 30. To the present end, the control device 34 may receive the information designating the base position (the specific station or the specific service zone) of each shared vehicle from the vehicle terminal 10 or the manager terminal. When the base position of each shared vehicle is determined, the control device 34 may map the base information of the determined base position to the corresponding shared vehicle and store it in the vehicle information DB 321.

The control device 34 may receive the user registration information from the user terminal 20 through the communication device 31. The control device 34 may register the corresponding user as the member of the vehicle sharing management server 30 based on the user registration information received from the user terminal 20. Also, the control device 34 may store the user information of the corresponding user in the user information DB 322 based on the user registration information received from the user terminal 20.

The control device 34 may link with the user terminal 20 to register the vehicle sharing usage booking for the shared vehicle. The control device 34 may receive the selection information (the rental period/rental time, the rental position, the return position, the current position, the vehicle type, etc.) required for booking the shared vehicle from the user terminal 20 through the communication device 31. The control device 34 may search for the shared vehicles matched to the selection information received from the user terminal 20 based on the booking status information and the usage status information of each shared vehicle stored in the vehicle information DB 321. In the instant case, when the selection information received from the user terminal 20 further includes the information indicating the booking method, the control device 34 may search for the bookable shared vehicles among the shared vehicles predetermined by the corresponding booking method. For example, when the selection information received from the user terminal 20 indicates the scheduled booking method, that is, the ScB method, the control device 34 may search for the bookable shared vehicles among the shared vehicles registered with the ScB method. Also, for example, when the selection information received from the user terminal 20 indicates the immediate booking method, that is, the IB method, the control device 34 may search for the bookable shared vehicles among the shared vehicles registered with the IB method. The control device 34 may also determine the corresponding booking method according to the selection information received from the user terminal 20, and search for the bookable shared vehicles among the shared vehicles to which the determined booking method is specified. For example, the control device 34 determines the ScB method as the booking method when the selection information for the rental period defined by the rental start time and the rental end time, the return position and the selection information for the rental position are received from user terminal 20. Also, for example, when the information for the current position information and the rental time is received from the user terminal 20, the control device 34 may determine the FF method as the booking method.

When the bookable shared vehicles are searched, the control device 34 may transmit the list of the searched shared vehicles to the user terminal 20. When the list of the bookable shared vehicles is transmitted to the user terminal 20, the control device 34 may transmit the information on the service zone where the shared vehicles included in the list are positioned, the station information where each shared vehicle is positioned, and the current position information of each shared vehicle together. Afterwards, when the shared vehicle selection information is received from the user terminal 20, the control device 34 may allocate the corresponding shared vehicle to the user of the user terminal 20 based on the selection information received from the user terminal 20, and register the usage booking to the shared vehicle. When the usage booking registration is completed, the control device 34 may update the booking status information of the shared vehicle stored in the vehicle information DB 321 and the booking history information stored in the user information DB 322 based on the predetermined booking information. Furthermore, the control device 34 may transmit the updated booking status information to the vehicle terminal 10 of the corresponding shared vehicle, and transmit the updated usage history information to the user terminal 20.

Figure 3:
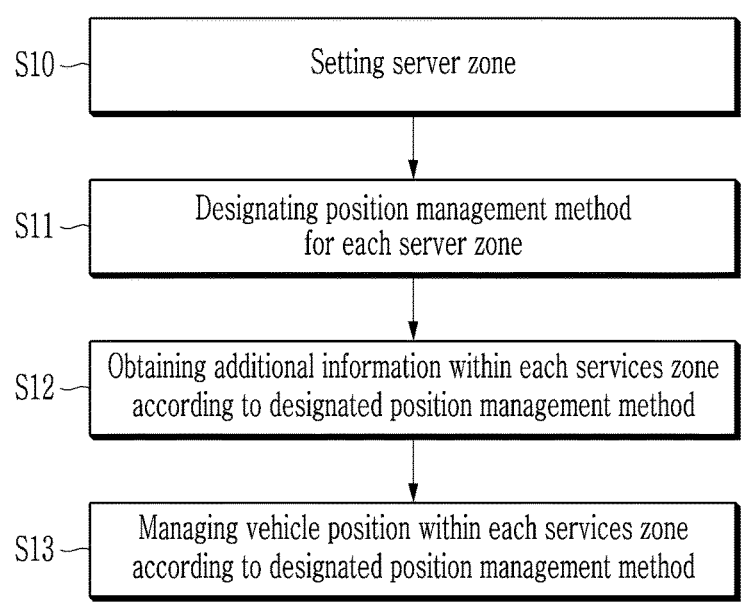
FIG. 3 is a schematic view showing a method for managing a service zone in a vehicle sharing management server according to an exemplary embodiment of the present invention.
Figure 4A:
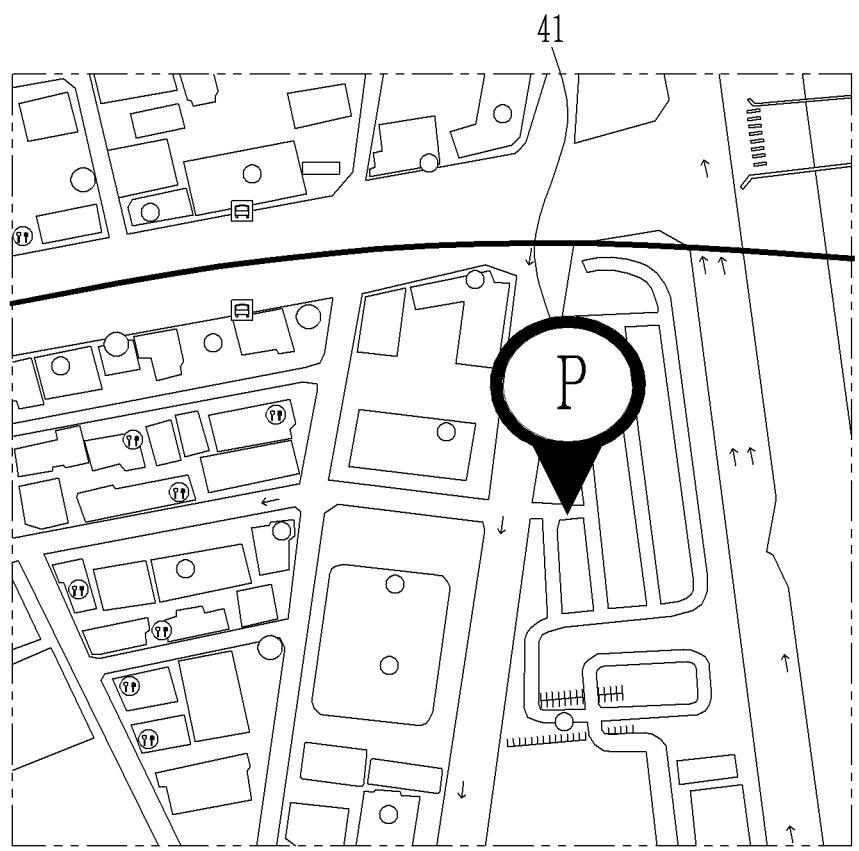
FIG. 4A and FIG. 4B are views for explaining a method for managing a position of shared vehicles according to a position management method in a vehicle sharing management server according to an exemplary embodiment of the present invention.
Figure 4B:

FIG. 3 is a schematic view showing a method for managing a service zone in a vehicle sharing management server according to an exemplary embodiment of the present invention. The service zone management method of FIG. 3 may be performed by the control device 34 of the vehicle sharing management server 30 described with reference to FIG. 1 and FIG. 2. FIG. 4A and FIG. 4B are views for explaining a method for managing a position of shared vehicles according to a position management method in a vehicle sharing management server according to an exemplary embodiment of the present invention.

Referring to FIG. 3, the control device 34 may set the service zones that provide the vehicle sharing service in the vehicle sharing management server 30 (S10). The control device 34 may define the position and polygonal area of each service zone based on the information received from the manager or manager terminal, and set the service zones by assigning the identification information (ID) to each service zone. In the present process, the control device 34 may acquire the position information, the area information, etc. of each service zone.

When the service zones are set, the control device 34 may designate the position management method (the SB method or FF method) for each service zone (S11). That is, the control device 34 may receive the selection information specifying the position management method of each service zone from the manager or manager terminal, and may designate the position management method of each service zone based on the received selection information.

The control device 34 may acquire the additional information for each service zone according to the position management method specified for each service zone (S12). For example, the control device 34 may acquire, as the additional information, the list of the stations positioned in the corresponding zone, the identification information (ID, the place name, etc.), and the position information of each station for the SB service zone. For example, for the FF service zone, the control device 34 may obtain area information for displaying the corresponding service zone in a polygonal form as additional information.

When the setting for each service zone is completed, the control device 34 may manage the vehicle position in each service zone according to the position management method specified for each service zone (S13).

In the step S13, the control device 34 may manage the rental position and return position so that the rental and return of the vehicle is possible only at the designated station within the service zone where the SB method is designated when the booking for the shared vehicle is predetermined. Furthermore, the control device 34 may manage the rental position and return position so that the rental and return of the vehicle is possible at any place within the service zone where the IB method is designated when the booking for the shared vehicle is predetermined.

In the step S13, the control device 34 may group and manage the shared vehicles for each station for the SB service zone. Referring to FIG. 4A, the control device 34 may transmit the position information of the station to the user terminal 20 so that, for the SB service zone, only the position 41 of the station rather than the position of the individual vehicle is displayed when the corresponding service zone is displayed in the user terminal 20. Furthermore, when the user selects the station, the control device 34 may transmit the vehicle list stocked to each station to the user terminal 20 so that the user terminal 20 may display the vehicle list stocked at the selected station.

In the step S13, the control device 34 may manage the position for each shared vehicle for the FF service zone. Referring to FIG. 4B, the control device 34 may transmit the position information of each shared vehicle to the user terminal 20 so that, for the FF service zone, the position 51 of each shared vehicle is displayed when the corresponding service zone is displayed in the user terminal 20. Furthermore, the control device 34 may transmit the area information of the corresponding service zone to the user terminal 20 so that the area 52 of the service zone is displayed along with the position of each shared vehicle.

Figure 5:
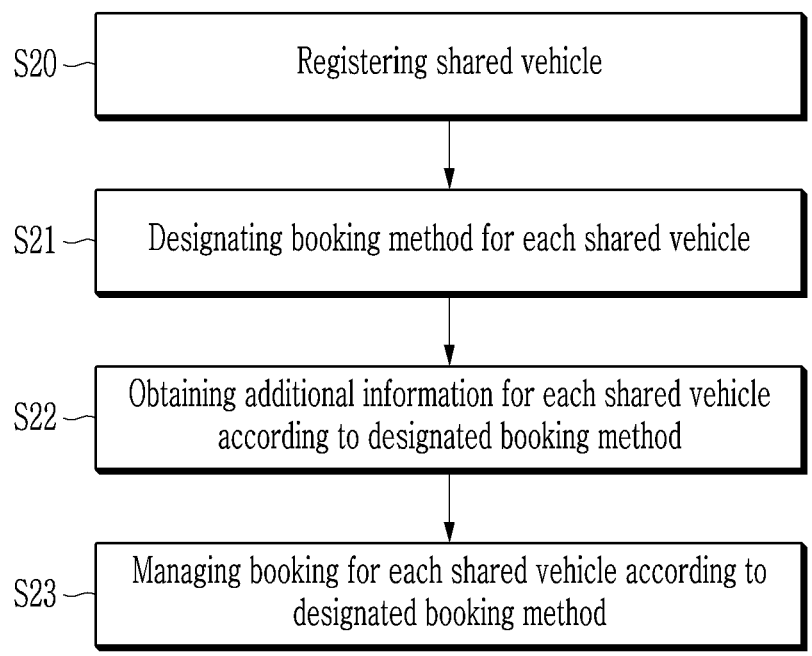
FIG. 5 is a schematic view showing a method for managing a shared vehicle in a vehicle sharing management server according to an exemplary embodiment of the present invention.

FIG. 5 is a schematic view showing a method for managing a shared vehicle in a vehicle sharing management server according to an exemplary embodiment of the present invention. The management method of the shared vehicle of FIG. 5 may be performed by the control device 34 of the vehicle sharing management server 30 described with reference to FIG. 1 and FIG. 2.

Referring to FIG. 5, the control device 34 may register the vehicles used for the vehicle sharing service as the shared vehicle in the vehicle sharing management server 30 (S20). The control device 34 may receive the vehicle registration information required for the shared vehicle registration from the vehicle terminal 10 or manager terminal connected through the communication device 31, or may receive it from the manager through the input device 33.

The control device 34 may designate the booking method (ScB and IB) for each shared vehicle registered in the vehicle sharing management server 30 (S21). The control device 34 may receive the information designating the booking method of each shared vehicle from the vehicle terminal 10 or the manager terminal through the communication device 31, and may designate the booking method of each shared vehicle based on this. The control device 34 may designate the booking method of each shared vehicle based on the control input received from the manager through the input device 33.

When the booking method of each shared vehicle is designated, the control device 34 may acquire the additional information related to the designated booking method through the vehicle terminal 10, the manager terminal, or the input device 33 (S22).

In the step S22, when the booking method specified for the shared vehicle is the ScB method, the control device 34 may further receive the additional information related to the minimum usage time of the shared vehicle, the buffer time before/after the rental period, and the like. Furthermore, when the booking method specified for the shared vehicle is the IB method, the control device 34 may further receive the additional information related to the rebooking limit of the shared vehicle, the waiting time after the booking, and the like.

Thereafter, the control device 34 may manage the booking for each shared vehicle according to the booking method specified for each shared vehicle (S23).

In the step S23, when the booking method is specified for each shared vehicle, the control device 34 may manage the booking of the shared vehicles so that the shared vehicles may only be booked by the specified booking method. When the selection information for the shared vehicle booking is received from the user terminal 20, the control device 34 may determine the booking method based on the input selection information. When the booking method is determined, the control device 34 may search for the shared vehicles that are bookable only among the shared vehicles according to the determined booking method. For example, when the selection information received from the user terminal 20 corresponds to the scheduled booking method, that is, the ScB method, the control device 34 may search for the bookable shared vehicles among the shared vehicles to which the ScB method is specified. Furthermore, for example, when the selection information received from the user terminal 20 corresponds to the immediate booking method, that is, the IB method, the control device 34 may search for the bookable shared vehicles from among the shared vehicles to which the IB method is specified.

According to the above-described exemplary embodiment of the present invention, the vehicle sharing system may support both the scheduled booking (ScB) method and the immediate booking (IB) method for the shared vehicle, and in managing the rental position/return position, may support both the station-based (SB) method and the free floating (FF) method. Furthermore, the users' satisfaction may be improved by preventing problems such as a duplicate booking from occurring in a process of integrating and providing the different booking methods. Furthermore, by assigning the booking method as an attribute value of the shared vehicle itself, it is possible to reduce the complexity of managing the shared vehicle.

The service zone management method of the vehicle sharing management server and the management method of the shared vehicle according to the above-described exemplary embodiment of the present invention may be executed through software. When being implemented through software, the components of the present invention are code segments that perform necessary works. The program or code segments may be stored on a processor readable medium or transmitted by a computer data signal coupled with a carrier wave in a transmission medium or communication network.

The computer-readable recording medium includes all kinds of recording devices in which data which may be read by the computer system is stored. Examples of the computer-readable recording medium include a ROM, a RAM, a CD-ROM, a DVD_ROM, a DVD_RAM, a magnetic tape, a floppy disk, a hard disk, and an optical data storage device. Furthermore, the computer-readable recording medium is distributed to the computer devices connected to the network so that the computer-readable code may be stored and executed by a distributed method.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle sharing system comprising:
    a server as a server for providing a vehicle sharing service, the sever comprising:
        a storage device configured for storing first information for designating one of a scheduled booking method and an immediate booking method as a booking method for each of a plurality of shared vehicles registered in the server; and
        a control device including a processor and configured to permit booking only by the scheduled booking method for a shared vehicle to which the scheduled booking method is specified among the plurality of shared vehicles, and to permit booking only by the immediate booking method for a shared vehicle to which the immediate booking method is specified among the plurality of shared vehicles; and
    a user terminal communicatively connected to the server,
    wherein the control device is further configured to receive vehicle registration information of each of the plurality of shared vehicles, to generate the first information for each of the plurality of shared vehicles based on the vehicle registration information,
    wherein the control device is further configured to receive selection information indicating one of the scheduled booking method and the immediate booking method from the user terminal, to determine at least one shared vehicle to be bookable among the plurality of shared vehicles based on the selection information and the first information, and to provide the user terminal with a list of the at least one shared vehicle to be bookable,
    wherein the user terminal provide the list of the at least one shared vehicle to a user by displaying the list on a display, and
    wherein the control device is further configured to automatically set one of a station based method and a free floating method as a position management method for each of the plurality of shared vehicles according to the booking method designated for each of the plurality of shared vehicles, and to manage a rental position and a return position of each of the plurality of shared vehicles, and for FF service zone, the control device obtains area information of a corresponding service zone and transmits the area information to the user terminal, and wherein the user terminal displays the area information of the corresponding service zone along with a position of each shared vehicle in a polygonal form.

2. The vehicle sharing system of claim 1, further including:
a communication device configured to communicate with the user terminal,
wherein the control device is configured to:
receive the selection information for a shared vehicle booking from the user terminal;
determine one of the scheduled booking method and the immediate booking method as a booking method according to the selection information; and
perform a booking procedure according to the determined booking method.

3. The vehicle sharing system of claim 2, wherein the control device is further configured to determine the at least one shared vehicle to be bookable among the shared vehicles to which a same booking method as the determined booking method is specified.

4. The vehicle sharing system of claim 3, wherein the control device is further configured to:
receive vehicle selection information from the user terminal; and
allocate one of at least one shared vehicle to be bookable to a user of the user terminal based on the vehicle selection information.

5. The vehicle sharing system of claim 1,
wherein the storage device is configured to store second information for designating one of the station based method and the free floating method as the position management method for each of the plurality of service zones in which the vehicle sharing service is provided, and
wherein the control device is further configured to manage the rental position and the return position of the shared vehicle in each service zone according to the second information.

6. The vehicle sharing system of claim 5, wherein the control device is further configured to:
manage the rental position and the return position so that the rental and return are possible only at a station for the service zone where the station-based method is specified among the plurality of service zones; and
manage the rental position and the return position so that the rental and return are possible at a place for the service zone to which the free floating method is specified among the plurality of service zones.

7. The vehicle sharing system of claim 1,
wherein the scheduled booking method is a method in which a user sets a rental period in advance and selects the shared vehicle to be booked among the shared vehicles that can be rented in a predetermined rental period, and
wherein the immediate booking method is a method in which the user selects the shared vehicle to be booked among the shared vehicles currently available for use by the user.

8. A management method of a shared vehicle as a management method of a shared vehicle of a server for providing a vehicle sharing service, the management method comprising:
receiving, by a vehicle sharing management server, vehicle registration information of each of a plurality of shared vehicles registered in the server;
generating, by a processor of the vehicle sharing management server, first information for designating, one of a scheduled booking method and an immediate booking method as a booking method for each of the plurality of shared vehicles based on the vehicle registration information and storing the first information in a storage of the vehicle sharing management server;
automatically setting, by the processor of the vehicle sharing management server, one of a station based method and a free floating (FF) method as a position management method for each of the plurality of shared vehicles according to the booking method designated for each of the plurality of shared vehicles, and for FF service zone, by the vehicle sharing management server, obtaining area information of a corresponding service zone and transmitting the area information to the user terminal; and
managing, by the processor of the vehicle sharing management server, a booking for each of the plurality of shared vehicles according to the designated booking method and the set position management method, and
in the managing the booking, the booking is permitted only by the scheduled booking method for the shared vehicle to which the scheduled booking method is specified among the plurality of shared vehicles, and the booking is permitted only by the immediate booking method for the shared vehicle to which the immediate booking method is specified among the plurality of shared vehicles,
wherein the managing the booking includes:
receiving selection information indicating one of the scheduled booking method and the immediate booking method from a user terminal communicatively connected to the vehicle sharing management server;
determining at least one shared vehicle to be bookable among the plurality of shared vehicles based on the selection information and the first information; and
providing the user terminal with a list of the at least one shared vehicle to be bookable; and
providing, by the user terminal, the list of the at least one shared vehicle to a user by displaying the list on a display,
wherein the user terminal displays the area information of the corresponding service zone along with a position of each shared vehicle in a polygonal form.

9. The management method of the shared vehicle of claim 8, wherein the managing the booking further includes:
determining one of the scheduled booking method and the immediate booking method as a vehicle booking method according to the selection information and the first information.

10. The management method of the shared vehicle of claim 9, wherein the determining the at least one shared vehicle to be bookable includes:
determining the at least one shared vehicle to be bookable in response to the selection information among the shared vehicles to which a same booking method as the determined vehicle booking method is specified;
receiving vehicle selection information from the user terminal; and allocating one of the at least one shared vehicle to be bookable a user of the user terminal based on the vehicle selection information.

11. The management method of the shared vehicle of claim 8, further including:

obtaining, by the vehicle sharing management server, additional information for each of the plurality of shared vehicles according to the designated booking method.

12. The management method of the shared vehicle of claim 11, wherein the additional information includes a minimum usage time or a buffer time before/after a rental period for the shared vehicle for which the scheduled booking method is specified, and a rebooking limit or waiting time after the booking for the shared vehicle for which the immediate booking method is specified.

* * * * *